US012410811B2

(12) United States Patent
Huang et al.

(10) Patent No.: US 12,410,811 B2
(45) Date of Patent: Sep. 9, 2025

(54) CROSS-FLOW FAN AND AIR CONDITIONER

(71) Applicant: GREE ELECTRIC APPLIANCES, INC. OF ZHUHAI, Zhuhai (CN)

(72) Inventors: Meiling Huang, Zhuhai (CN); Jianhuang Zou, Zhuhai (CN); Fuqi Chen, Zhuhai (CN); Haohao He, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 18/824,620

(22) Filed: Sep. 4, 2024

(65) Prior Publication Data

US 2024/0426314 A1 Dec. 26, 2024

Related U.S. Application Data

(63) Continuation of application No. PCT/CN2023/087840, filed on Apr. 12, 2023.

(30) Foreign Application Priority Data

Jun. 27, 2022 (CN) ........................ 202210736124.0

(51) Int. Cl.
*F04D 29/30* (2006.01)
*F04D 29/66* (2006.01)
*F24F 1/0025* (2019.01)

(52) U.S. Cl.
CPC ........... *F04D 29/30* (2013.01); *F04D 29/666* (2013.01); *F24F 1/0025* (2013.01); *F05B 2240/301* (2013.01)

(58) Field of Classification Search
CPC ...... F04D 29/30; F04D 29/666; F04D 29/667; F24F 1/0025
See application file for complete search history.

(56) References Cited

U.S. PATENT DOCUMENTS

| | | | | |
|---|---|---|---|---|
| 9,382,913 | B2 * | 7/2016 | Shiraichi | F04D 29/283 |
| 11,466,871 | B2 * | 10/2022 | Teraoka | F04D 29/283 |
| 2013/0101405 | A1 | 4/2013 | Shiraichi et al. | |

FOREIGN PATENT DOCUMENTS

| | | | |
|---|---|---|---|
| CN | 103403355 | A | 11/2013 |
| CN | 104728162 | A | 6/2015 |

(Continued)

OTHER PUBLICATIONS

International Search Report and Written Opinion mailed Jun. 19, 2023, issued in corresponding International Application No. PCT/CN2023/087840, filed Apr. 12, 2023, 12 pages.

(Continued)

*Primary Examiner* — Sabbir Hasan
(74) *Attorney, Agent, or Firm* — Christensen O'Connor Johnson Kindness PLLC

(57) ABSTRACT

A cross-flow fan and an air conditioner. The cross-flow fan includes a plurality of blades. The plurality of blades are arranged and spaced apart around a rotation axis of the cross-flow fan. Each blade has a blade centerline, and in a cross-section of each blade, the blade centerline is an arc, and a thickness of the blade continuously increases first and then continuously decreases from a middle position of the blade centerline toward two end positions thereof. In a flow channel of an airflow, the thickness of the blade of the cross-flow fan forms a double-hump distribution, thereby reducing an airflow separation and loss.

11 Claims, 8 Drawing Sheets

(56) References Cited

FOREIGN PATENT DOCUMENTS

| | | | |
|---|---|---|---|
| CN | 208831322 | U | 5/2019 |
| CN | 114502842 | A | 5/2022 |
| CN | 115234511 | A | 10/2022 |
| CN | 218522841 | U | 2/2023 |
| EP | 2476909 | A1 | 7/2012 |
| EP | 2639458 | A1 | 9/2013 |
| JP | 2001263285 | A | 9/2001 |
| JP | 2001280292 | A | 10/2001 |
| JP | 2016223352 | A | 12/2016 |

OTHER PUBLICATIONS

Office Action mailed Jun. 18, 2025, in corresponding Chinese application No. 202210736124.0, filed Jun. 27, 2022, 12 pages.

Extended European Search Report mailed Jun. 23, 2025, issued in corresponding European Application No. EP 23829608, filed Apr. 12, 2023, 7 pages.

* cited by examiner

CROSS-FLOW FAN AND AIR CONDITIONER

The present application is a continuation application of PCT Patent Application No. PCT/CN2023/087840, filed on Apr. 12, 2023, which claims the priority of Chinese patent application No. 202210736124.0, filed on Jun. 27, 2022, and entitled "CROSS-FLOW FAN AND AIR CONDITIONER", which are incorporated herein by reference in their entireties.

TECHNICAL FIELD

The present invention belongs to the technical field of air conditioning, and in particular relates to a cross-flow fan and an air conditioner.

BACKGROUND

Cross-flow fans are widely used in existing indoor units of split air conditioners. When the cross-flow fan rotates, the airflow flows in and out between the cross-flow fan blades twice. The airflow at an inlet side of the blades flows through the blades from the outside to the inside of the cross-flow fan for the first time, and the airflow close to an outlet side of the air duct passes through the blades and flows out of the air duct of the blades from the inside of the cross-flow fan for the second time. Therefore, the shape of the cross-flow fan blade forms both the air inlet and the air outlet. The blade surface of the existing cross-flow fan blade is mostly a smooth curved surface, and the blade shape is designed to have a single arc. The blade consists of an outer arc, an inner arc, a blade back-face curve, and a blade basin-face curve. The maximum thickness of the cross-flow fan blade is located in the center of the blade centerline, and the maximum thickness is d1, that is, the blade is thin at two ends and thick in the middle. Based on researches, the traditional blade with the larger thickness in the middle and the smaller thickness at two ends causes a serious airflow separation when the airflow flows in or out through the cross-flow fan. The phenomenon of the separation causes a flow loss and increases a power consumption of the indoor unit, and also causes a problem of noise of the indoor unit. In order to overcome the aforementioned deficiencies, the applicant has changed the position corresponding to the maximum thickness of the traditional blade from the middle of the blade to close to the outer end of the blade, such that the degree of the separation of the airflow, compared with that of the airflow passing through the traditional cross-flow fan, can be reduced to a certain extent, thereby reducing the flow loss and the power consumption of the indoor unit. However, for a blade with such a shape, it is still possible to reduce the degree of separation of the airflow from the outlet side of the cross-flow fan and the flow loss caused by the cross-flow fan as a whole.

SUMMARY

Therefore, the present disclosure provides a cross-flow fan and an air conditioner, which can overcome the defects of the cross-flow fan in the related art that a shape design of the blades cannot balance the reduction of a degree of airflow separation at an air inlet side and at an air outlet side of the airflow, the reduction of a relatively large airflow loss of a fan and the reduction of a relatively large power consumption of an indoor unit.

In order to solve the above problems, the present disclosure provides a cross-flow fan, including a plurality of blades. The plurality of blades are arranged and spaced apart around a rotation axis of the cross-flow fan; each blade has a blade centerline; and in a cross-section of each blade, the blade centerline is an arc, and a thickness of the blade continuously increases first and then continuously decreases from a middle position of the blade centerline toward two end positions thereof.

In some embodiments, the blade has an outer end and an inner end; the minimum thickness of the blade at the middle position is dmin; a first portion of the blade between the middle position and the outer end has a first maximum thickness dmax1; a second portion of the blade between the middle position and the inner end has a second maximum thickness dmax2; and it is satisfied that dmin<dmax2<dmax1.

In some embodiments, the outer end is formed by an outer end arc, and the radius of the outer end arc is do; the inner end is formed by an inner end arc, and the radius of the inner end arc is di; and dmin is not less than the smaller one of do and di.

In some embodiments, a line connecting a circle center of the outer arc and a circle center of the blade centerline is a first line segment; a line connecting a circle center of the inner arc and the circle center of the blade centerline is a second line segment; and an angle θ is formed between the first line segment and the second line segment. A line connecting the circle center of the blade centerline and an intersection, formed by a straight line, where the first maximum thickness is located, intersecting with the blade centerline, is a third line segment; and an angle α is formed between the third line segment and the first line segment. It is satisfied that $$\frac{\theta}{5} < \alpha < \frac{\theta}{3}.$$

In some embodiments, a line connecting the circle center of the blade centerline and an intersection, formed by a straight line, where the minimum thickness dmin at the middle position is located, intersecting with the blade centerline, is a fourth line segment; an angle φ is formed between the fourth line segment and the first line segment; and it is satisfied that $$\frac{\theta}{2} < \varphi < \frac{3\theta}{4}.$$

In some embodiments, a line connecting the circle center of the blade centerline and an intersection, formed by a straight line, where the second maximum thickness is located, intersecting with the blade centerline, is a fifth line segment; an angle β is formed between the fifth line segment and the first line segment; and it is satisfied that $$\frac{2\theta}{3} < \beta < \frac{4\theta}{5}.$$

In some embodiments, in the cross-section of the blade, the outer end arc and the inner end arc are connected by a blade back curve and a blade basin curve, respectively and the blade back curve and the blade basin curve each are smooth transition curves.

The present disclosure further discloses an air conditioner, including the cross-flow fan above.

In the cross-flow fan and the air conditioner provided by the present disclosure, the thickness of the blade has two change processes of thickness increase and thickness decrease. That is, the blade back curve and the blade base curve of the blade each have two change processes of thickness increase and thickness decrease, so that, in the flow channel of the airflow, the thickness of the blade forms a double-hump distribution instead of a single thickness increase in the related technology. In this way, the degree of airflow separation can be effectively reduced at both the inlet side and the outlet side of the airflow, especially the airflow loss due to separation, which is generated when the airflow flows into and out of the flow channel twice, can be reduced, thereby effectively reducing the airflow loss of the fan and the power consumption of the indoor unit, and additionally further reducing the noise of the airflow.

Figure 1:
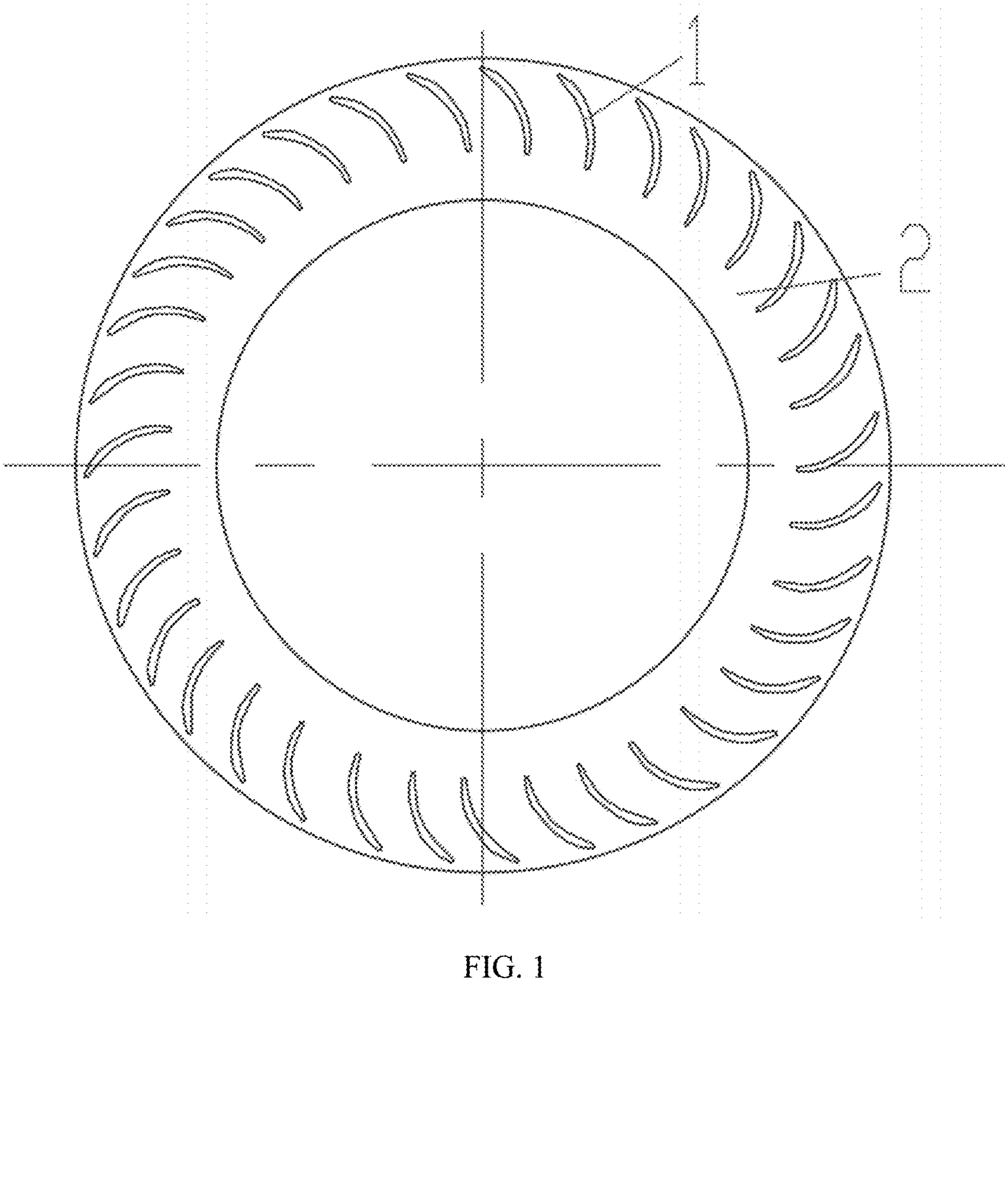
FIG. 1 is a sectional view (radial cross-sectional view) showing a structure of a cross-flow fan according to an embodiment of the present disclosure.

The reference numerals are:

1. blade; 11. blade centerline; 12. outer end; 13. inner end; 14. blade back curve; 15. blade basin curve; 2. plate body.

DETAILED DESCRIPTION OF THE EMBODIMENTS

With reference to FIGS. 1 to 7, according to an embodiment of the present disclosure, a cross-flow fan is provided, and the cross-flow fan includes a plurality of blades 1. The plurality of blades 1 are arranged and spaced apart around a rotation axis of the cross-flow fan. Generally speaking, an interval between two circumferentially adjacent blades 1 is uniform, and the corresponding ends of the plurality of blades 1 each are connected to a plate body 2 which may be, for example, a partition plate or an end baffle, to form an integral body. Each blade 1 has a blade centerline 11, and in a cross-section of the blade 1 (which may also be understood as a projection surface formed by projecting the blade along an axis direction of the cross-flow fan), the blade centerline 11 is an arc. The thickness of the blade 1 continuously increases first and then continuously decreases from the middle position of the blade centerline 11 towards two end positions thereof. In this technical solution, in the flow channel of the airflow, the thickness of the blade 1 has two change processes of thickness increase and thickness decrease. That is, a blade back curve 14 and a blade base curve 15 of the blade 1 each have two change processes of thickness increase and thickness decrease, so that, in the flow channel of the airflow, the thickness of the blade 1 forms a double-hump distribution instead of a single thickness increase in the related technology. In this way, the degree of airflow separation can be effectively reduced at both the inlet side and the outlet side of the airflow, especially the airflow loss due to separation, which is generated when the airflow flows into and out of the flow channel twice, can be reduced, thereby effectively reducing the airflow loss of the fan and the power consumption of the indoor unit, and additionally further reducing the noise of the airflow.

It should be noted that the blade centerline 11 is a line formed by connecting the midpoints at various positions corresponding to different thicknesses of the blade 1 from the inner end to the outer end. When the blade centerline 11 is an arc, namely, has a single curvature radius, the blade back curve 14 and the blade basin curve 15 each have two change processes of thickness increase and thickness decrease.

Figure 2:
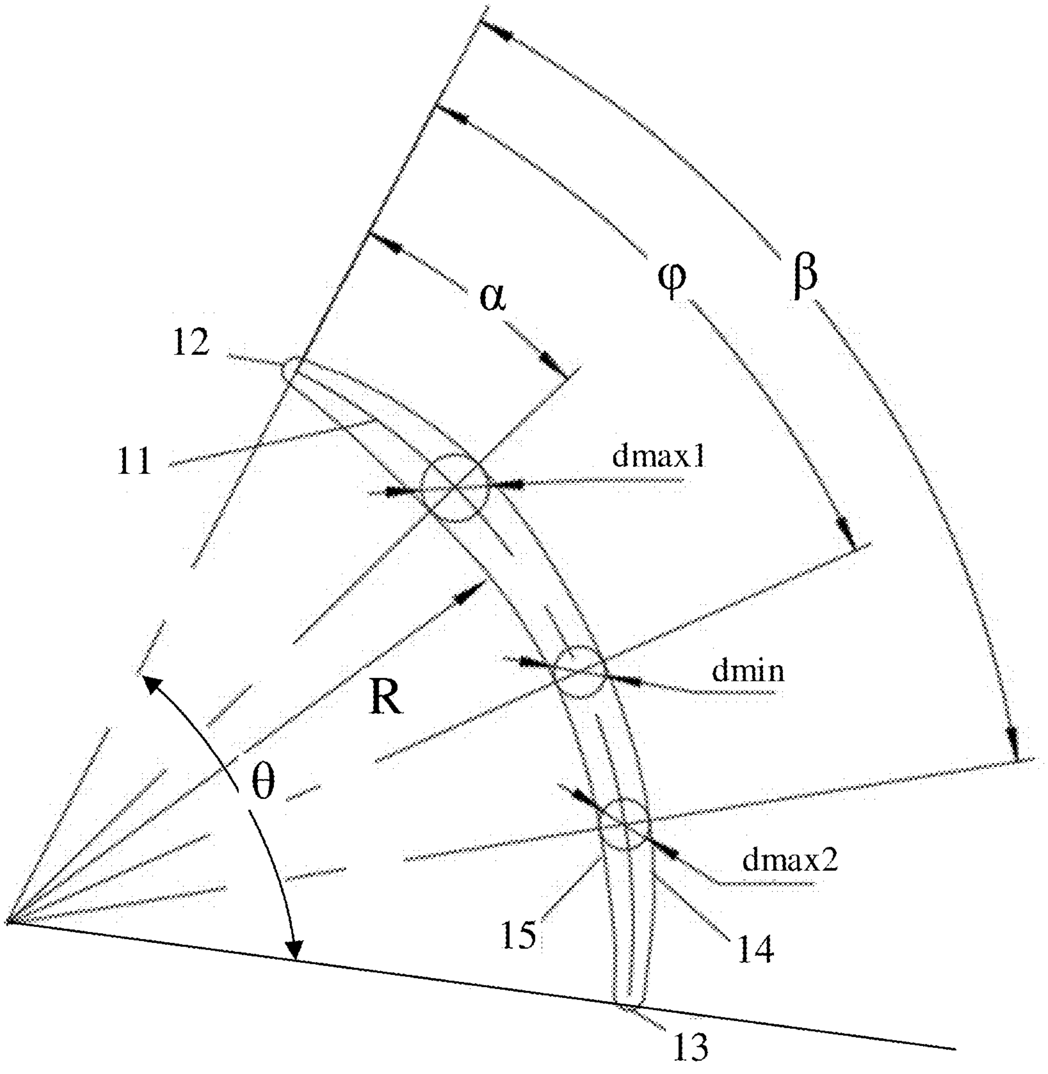
FIG. 2 is a view showing a structure of a blade shown in FIG. 1.
Figure 3A:
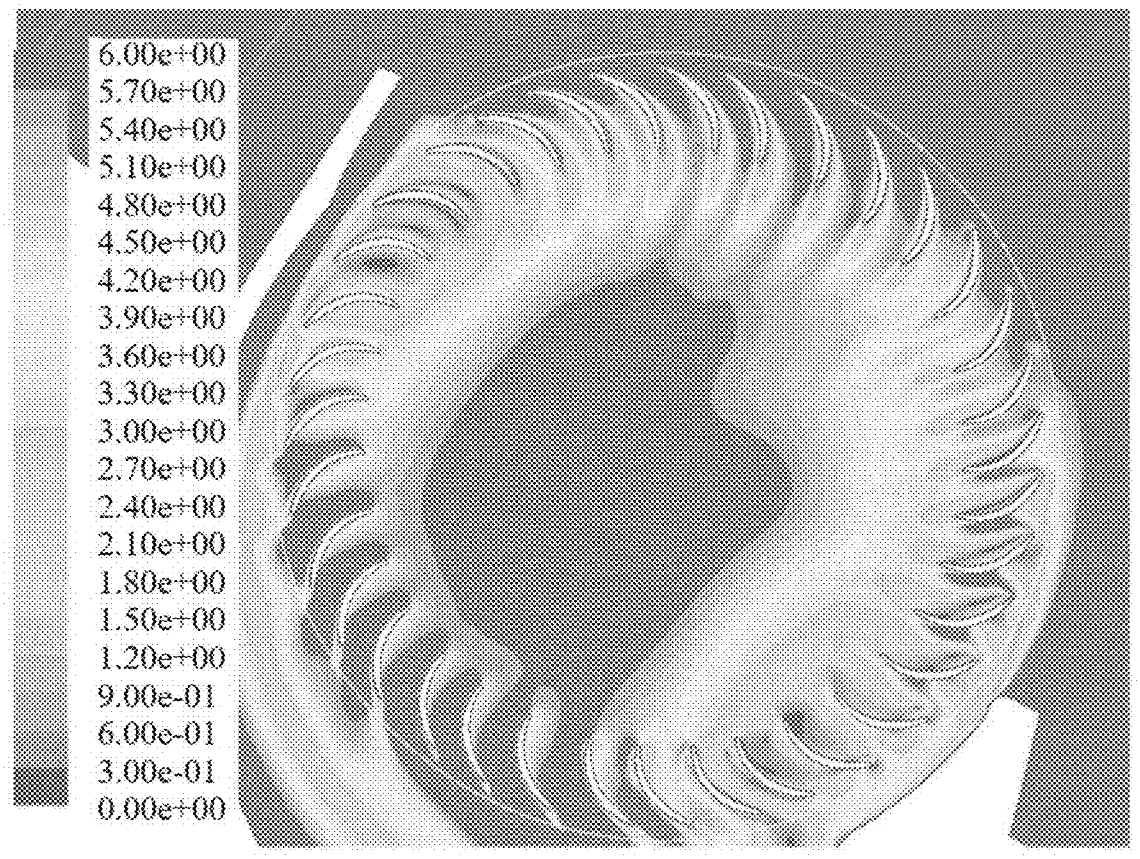
FIG. 3*a* is a cloud diagram showing an airflow separation at an inlet side and an outlet side of blades in the related art.
Figure 3B:
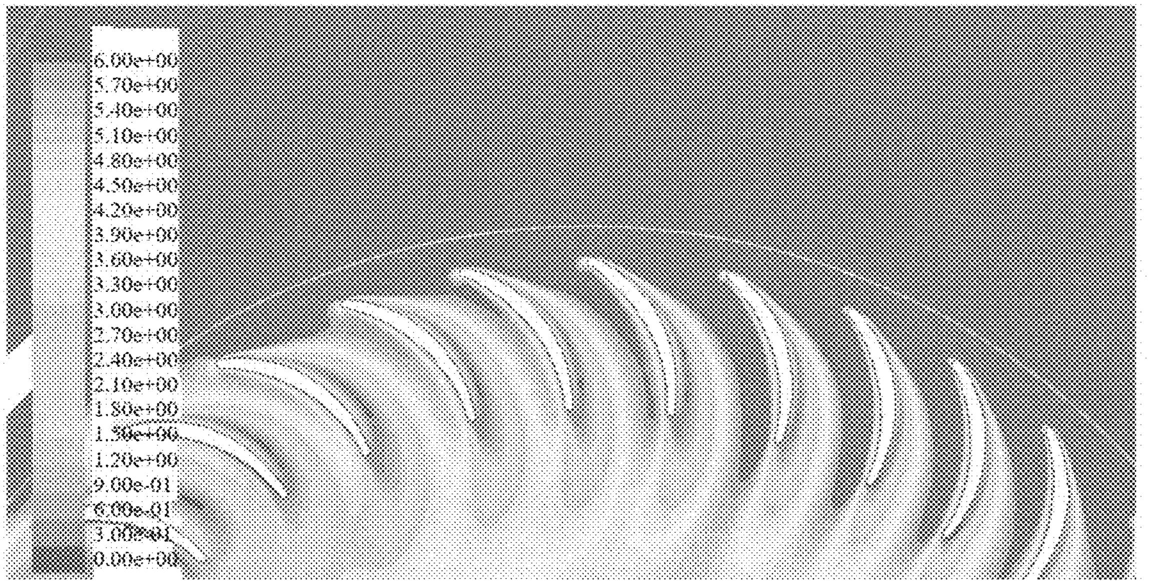
FIG. 3*b* is a cloud diagram showing an airflow separation at the inlet side of the blades in FIG. 3*a;*
Figure 4:
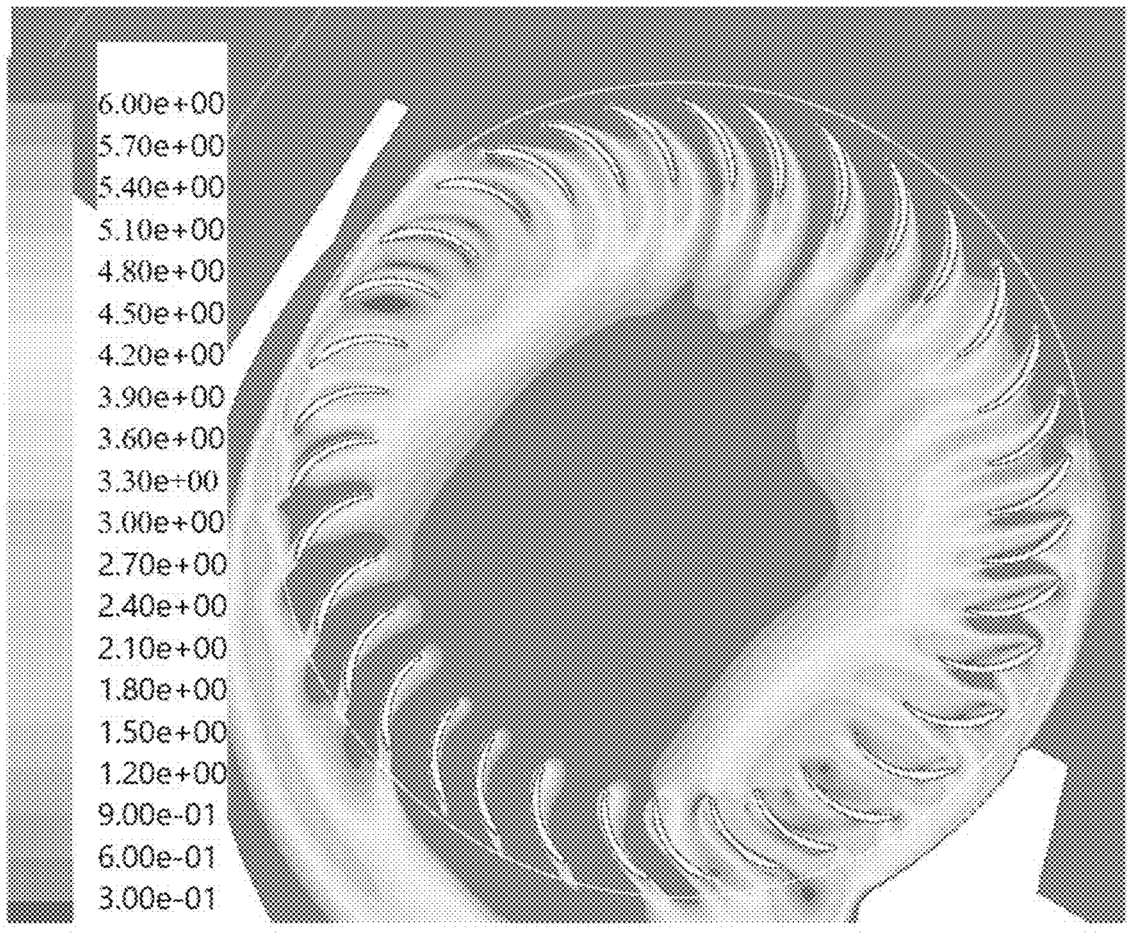
FIG. 4 is a cloud diagram showing an airflow separation at an inlet side and an outlet side of blades in a technical solution of the present disclosure.

As shown in FIG. 2, the blade 1 has an outer end 12 and an inner end 13, the minimum thickness at the middle position of the blade 1 is dmin, a first portion of the blade 1 between the middle position and the outer end 12 has a first maximum thickness dmax1, and a second portion of the blade 1 between the middle position and the inner end 13 has a second maximum thickness dmax2, it is satisfied that dmin<dmax2<dmax1, that is, the blade thickness is designed to be larger in the front and smaller in the rear relative to a leading edge of the blade, which can further reduce the degree of airflow separation of the airflow at the air inlet side of the cross-flow fan while reducing the degree of airflow separation of the airflow at the air outlet side of the cross-flow fan.

The outer end 12 is formed by an outer arc with a radius of do, and the inner end 13 is formed by an inner arc with a radius of di. Where, dmin is not less than the smaller one of do and di, such that the overall structural strength of the blade 1 can be ensured.

In some embodiments, a line connecting a circle center of the outer arc and a circle center of the blade centerline 11 is a first line segment, a line connecting a circle center of the inner arc and the circle center of the blade centerline 11 is a second line segment, an angle θ is formed between the first line segment and the second line segment. A line, which connects the circle center of the blade centerline 11 and an intersection, formed by a straight line where the first maximum thickness is located intersecting with the blade centerline 11, is a third line segment. An angle α is formed between the third line segment and the first line segment, and $$\frac{\theta}{5} < \alpha < \frac{\theta}{3}.$$

In some embodiments, a line, which connects the circle center of the blade centerline 11 and an intersection, formed by a straight line where the minimum thickness dmin at the middle position is located intersecting with the blade centerline 11, is a fourth line segment, and an angle φ is formed between the fourth line segment and the first line segment, and $$\frac{\theta}{2} < \varphi < \frac{3\theta}{4}.$$

In some embodiments, A line, which connects the circle center of the blade centerline 11 and an intersection, formed by a straight line where the second maximum thickness is located intersecting with the blade centerline 11, is a fifth line segment, and an angle β is formed between the fifth line segment and the first line segment, and $$\frac{2\theta}{3} < \beta < \frac{4\theta}{5},$$

so that α<φ<β. It can be understood that the intersections, which are formed by the straight lines where these thicknesses are located respectively intersecting with the blade centerline 11, are in the same cross section, and specifically, the cross section is the cross section shown in FIG. 2. The aforementioned angles are used to control the positions corresponding to the thicknesses of the blade. The first thickness corresponds to a position close to the front side of the centerline, the second thickness corresponds to a position close to the rear side and exceeding two thirds length of the blade, and the minimum thickness in the middle position is close to the middle and rear side.

Figure 5:
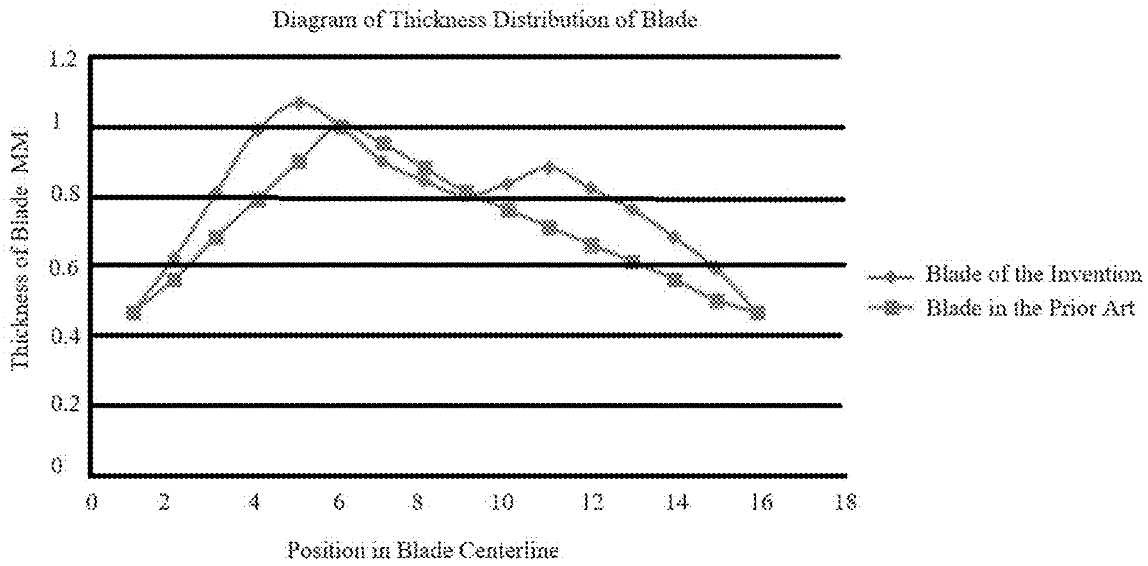
FIG. 5 is a diagram showing a comparison of a thickness distribution on a blade centerline of the blade in the present disclosure and that of a blade in the related art.

In some embodiments, in the cross section of the blade 1, the outer end arc and the inner end arc are connected by the blade back curve 14 and the blade basin curve 15 respectively, and the blade back curve 14 and the blade basin curve 15 each are smooth transition curves, thus reducing the airflow loss caused by a contact between the airflow and the blade 1. Specifically, as shown in FIG. 5, the thickness of the blade 1 of the present disclosure presents two smooth change processes of thickness increase and thickness decrease along the centerline of the blade from the outer end to the inner end, thus forming a double-hump structure.

Figure 6:
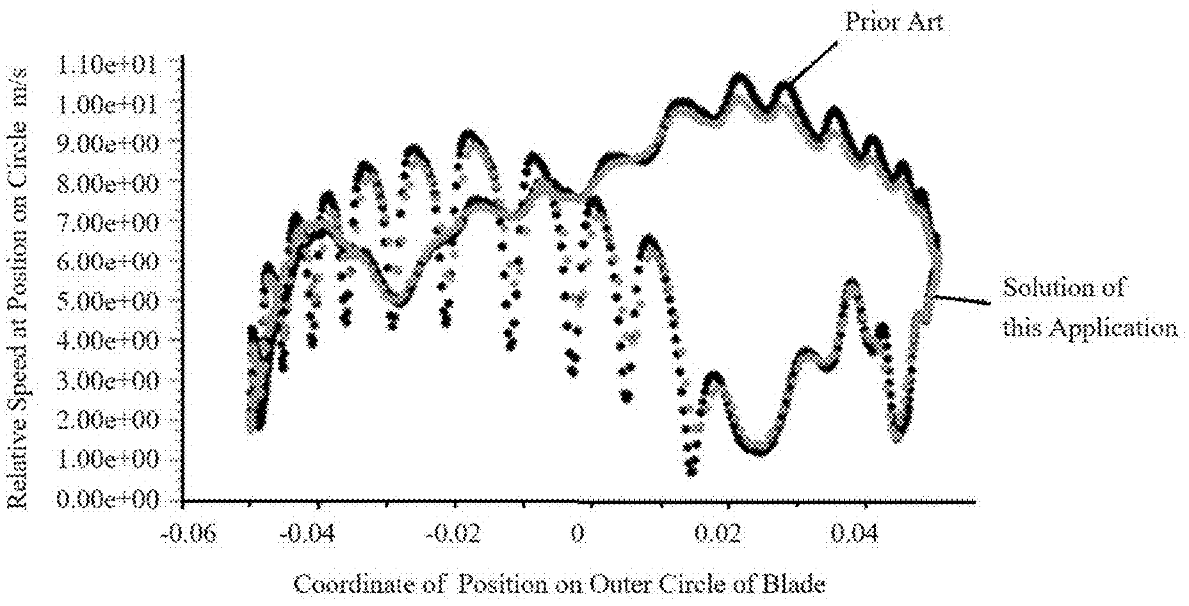
FIG. 6 is a view showing a comparison of relative speeds at various positions on an outer diameter of a circle of a fan blade in a cross-flow fan of the present disclosure and those of a fan blade in a cross-flow fan in the related art.
Figure 7:
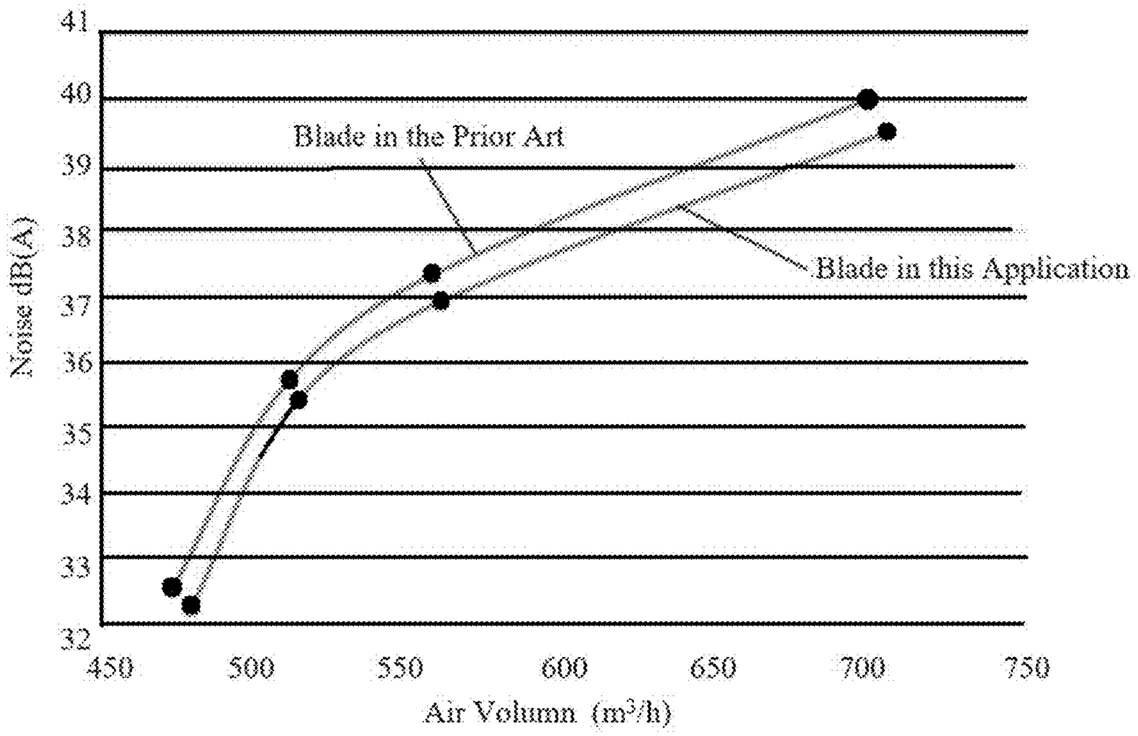
FIG. 7 is a view showing a comparison of a test result of an airflow noise in the cross-flow fan of the present disclosure and that of the cross-flow fan in the related art.

In a specific embodiment, design parameters of the blade 1 are as follows: dmax1=1.066 mm, dmax2=0.836 mm, dmin=0.828 mm, θ=69°, α=18°, Φ=39°, β=53°. The cross-flow fan blade of the present invention is designed in three dimensions and molded for production. The processed cross-flow fan blades are installed in the indoor unit of the air conditioner for experimental testing. A comparation of the test results is shown in FIG. 7. Compared with the existing fan blade, the fan blade of the present invention can reduce the noise of the indoor unit by 1 to 2 dBA while maintaining the air volume basically the same. As shown in FIG. 6, by using the cross-flow fan of the present invention, relative speeds at the outer circle of the fan blade (namely, relative speeds at various positions on an outer diameter of the circle of the fan blade) of the present disclosure are lower than those of the fan blade in the related art, which also shows that the noise level of the cross-flow fan is also improved.

According to an embodiment of the present disclosure, an air conditioner is also provided, and the air conditioner includes the above-mentioned cross-flow fan.

It is easy for those ordinary skill in the art to understand that, under the premise of no conflict, the advantageous technical features of the embodiments above may be freely combined and superimposed.

Described above are only preferred embodiments of the present disclosure and are not intended to limit the present disclosure. Any modifications, equivalent replacements and improvements made within the spirits and principles of the present disclosure would be within the protection scope of the present disclosure. The above are only preferred implementations of the present disclosure. It should be pointed out that, for those ordinary skill in the art, various improvements and variations may be made without departing from the technical principles of the present disclosure, and these improvements and variations should also be regarded as the protection scope of the present disclosure.

What is claimed is:

1. A cross-flow fan, comprising a plurality of blades, wherein the plurality of blades are arranged and spaced apart around a rotation axis of the cross-flow fan; each blade has a blade centerline; and in a cross-section of each blade, the blade centerline is an arc, and a thickness of each blade continuously increases first and then continuously decreases from a middle position of the blade centerline toward two end positions thereof;

wherein each blade has an outer end and an inner end; a minimum thickness of each blade at the middle position is dmin; a first portion of each blade between the middle position and the outer end has a first maximum thickness dmax1; a second portion of each blade between the middle position and the inner end has a second maximum thickness dmax2; and it is satisfied that dmin<dmax2<dmax1.

2. An air conditioner, comprising the cross-flow fan according to claim 1.

3. The cross-flow fan according to claim 1, wherein the outer end is formed by an outer end arc, and the radius of the outer end arc is do; the inner end is formed by an inner end arc, and the radius of the inner end arc is di; and dmin is not less than the smaller one of do and di.

4. The cross-flow fan according to claim 3, wherein:

a line connecting a circle center of the outer arc and a circle center of the blade centerline is a first line segment; a line connecting a circle center of the inner arc and the circle center of the blade centerline is a second line segment; and an angle θ is formed between the first line segment and the second line segment;

a line connecting the circle center of the blade centerline and an intersection, formed by a straight line, where the first maximum thickness is located, intersecting with the blade centerline, is a third line segment; and an angle φ is formed between the third line segment and the first line segment; and it is satisfied that $$\frac{\theta}{5} < \alpha < \frac{\theta}{3}.$$

5. The cross-flow fan according to claim 4, wherein: a line connecting the circle center of the blade centerline and an intersection, formed by a straight line, where the minimum thickness dmin at the middle position is located, intersecting with the blade centerline, is a fourth line segment; an angle φ is formed between the fourth line segment and the first line segment; and it is satisfied that $$\frac{\theta}{2} < \varphi < \frac{3\theta}{4}.$$

6. The cross-flow fan according to claim 5, wherein θ=69° and Φ=39°.

7. The cross-flow fan according to claim 4, wherein: a line connecting the circle center of the blade centerline and an intersection, formed by a straight line, where the second maximum thickness is located, intersecting with the blade centerline, is a fifth line segment; an angle β is formed between the fifth line segment and the first line segment; and it is satisfied that $$\frac{2\theta}{3} < \beta < \frac{4\theta}{5}.$$

8. The cross-flow fan according to claim 7, wherein θ=69° and β=53°.

9. The cross-flow fan according to claim 4, wherein θ=69° and α=18°.

10. The cross-flow fan according to claim 3, wherein, in the cross-section of each blade, the outer end arc and the inner end arc are connected by a blade back curve and a blade basin curve respectively, and the blade back curve and the blade basin curve each are smooth transition curves.

11. The cross-flow fan according to claim 1, wherein dmax1=1.066 mm, dmax2-0.836 mm, and dmin=0.828 mm.

* * * * *